United States Patent [19]

Simone et al.

[11] Patent Number: 5,407,661
[45] Date of Patent: * Apr. 18, 1995

[54] PET CHEW PRODUCT HAVING ORAL CARE PROPERTIES

[75] Inventors: Alexander J. Simone, Somerset, N.J.; John J. Hefferren, Lawrence; Michael S. Hand, Maple Hill; Gordon Huber, Sabetha, all of Kans.

[73] Assignee: Colgate-Palmolive Company, Piscataway, N.J.

[*] Notice: The portion of the term of this patent subsequent to Mar. 22, 2011 has been disclaimed.

[21] Appl. No.: 118,369

[22] Filed: Sep. 8, 1993

Related U.S. Application Data

[63] Continuation of Ser. No. 822,241, Jan. 17, 1992, Pat. No. 5,296,209.

[51] Int. Cl.$^6$ .................... 426 807; 426 805; A61K 7/16; A61K 9/20; A61K 31/715; A61K 7/26
[52] U.S. Cl. .................... 424/49; 424/401; 424/439; 424/442; 424/57; 426/807; 426/805
[58] Field of Search .................. 424/49-58, 424/401, 439, 442, 447; 426/807, 805, 658, 648, 635, 630, 623, 618, 578, 560, 549, 3

[56] References Cited

U.S. PATENT DOCUMENTS

| | | | |
|---|---|---|---|
| 4,276,311 | 6/1981 | Burrows et al. | 426/805 |
| 4,515,772 | 5/1985 | Parran et al. | 424/57 |
| 4,624,856 | 11/1986 | Vanderveer et al. | 426/549 |
| 4,806,340 | 2/1989 | Gaffar et al. | 424/52 |
| 4,822,599 | 4/1989 | Mitra | 424/52 |
| 4,885,155 | 12/1989 | Parran et al. | 424/52 |
| 4,906,456 | 3/1990 | Gaffar et al. | 424/52 |
| 4,925,654 | 6/1990 | Gaffar et al. | 424/52 |
| 4,931,273 | 6/1990 | Gaffar et al. | 424/52 |
| 4,966,771 | 10/1990 | Gaffar et al. | 424/52 |
| 4,999,184 | 3/1991 | Parran et al. | 424/52 |
| 5,000,940 | 3/1991 | Staples | 424/57 |
| 5,000,943 | 3/1991 | Scaglione et al. | 424/57 |
| 5,000,973 | 3/1991 | Scaglione et al. | 426/549 |
| 5,015,485 | 5/1991 | Scaglione et al. | 426/94 |
| 5,296,209 | 3/1994 | Simone et al. | 424/49 |

*Primary Examiner*—Shep K. Rose
*Attorney, Agent, or Firm*—Paul Shapiro; Robert C. Sullivan

[57] ABSTRACT

An edible pet chew product having a flexible cellular matrix in which is contained a cellulosic fibrous material such as corn cob fractions having a mechanical cleansing function, which when chewed by the pet, effects a reduction in plaque, stain and tartar on the pet's teeth. An oral care additive may be incorporated in the matrix to inhibit dental problems, the composition of the cellular matrix being substantially inert to the oral care additive.

32 Claims, 1 Drawing Sheet

PET CHEW PRODUCT HAVING ORAL CARE PROPERTIES

This is a Continuation of application Ser. No. 07/822,241, filed Jan. 17, 1992, now U.S. Pat. No. 5,296,209.

BACKGROUND OF THE INVENTION

1. Field of the Invention

This invention relates to an edible animal chew product having a flexible, inert cellular matrix containing a cellulosic fibrous material. The edible product, when chewed by animals such as dogs and cats, reduces plaque, stain and tartar.

DESCRIPTION OF THE PRIOR ART

Animal pets, such as dogs and cats, like their human counterparts, are subject to dental health problems. These problems can be traced to the formation of bacterial plaque which forms on the exterior surface of teeth. Plaque is an invisible, sticky film of bacteria, salivary proteins and polysaccharides which is not easily washed away. Plaque is now generally recognized as the main culprit of poor oral health. Bacteria that produce the acid for the caries process are held to the tooth surface by the plaque matrix as well as other bacteria which cause redness and swelling (gingivitis). The presence of these bacteria, if left untreated, may spread to cause malodor, periodontal disease, gingival pockets and bone loss.

Dental calculus, or tartar, is the result of the thickening and hardening (mineralization) of dental plaque. Tartar which is not easily removed accumulates on the tooth surface, mainly at the gingival margin opposite the salivary glands. It is a hard mineral deposit containing predominantly calcium and phosphate, very tightly bound to the tooth surface. Once it is formed, tartar is virtually impossible to remove except by a dental professional. Tartar can become unsightly if growth is left unimpeded, and elimination is desirable as the porous surface of the calculus will be covered by a thin layer of unmineralized plaque which can cause constant irritation of the gums and can trigger other problems once calculus is formed below the gum line.

Commercial animal pet foods do not provide sufficient surface cleaning to teeth to provide for plaque removal from the animal's teeth necessary for optimum dental health.

A variety of products are manufactured to provide animal pets with objects to chew or gnaw. They are intended to provide the pet with exercise for the teeth to maintain a healthy condition satisfying a need which arose when the natural pet food, raw meat, was replaced with processed pet foods. Rawhide strips knotted on the ends to resemble bones, for example, provide abrasion for cleaning teeth by removing tartar and massaging the gums, which is not provided by the typical canine dog food. The rawhide dog chews are expensive, and the indigestible leather fragments swallowed by the dogs frequently cause severe gastrointestinal blockage or diarrhea.

European patent 272,968 discloses a chewable product for dogs and other domestic animals wherein certain aqueous solutions of oral care agents, e.g., sodium fluoride (anti-caries agent), sodium benzoate (anticalculus agent) and bromochlorophene (antimicrobial/antiplaque agent) are used to soak rawhide, beef tendon, or ligament. The solution treated product is then dried whereby the oral care agents are absorbed into the surface of the product.

U.S. Pat. Nos. 5,000,940 and 5,000,943 disclose baked dog biscuits containing an inorganic pyrophosphate salt, e.g., tetrasodium pyrophosphate, which when chewed and/or eaten by dogs cause a reduction in tartar accumulations on their teeth.

The oral care agents incorporated in the pet food products of the prior art have either limited efficacy in oral care, or are incompatible and deactivated by the ingredients found in the products into which these agents are incorporated. For example, anti-tartar pyrophosphate salts incorporated in pet food products containing an excess of polyvalent cations, and particularly calcium, are rendered inactive by the calcium ion interacting with the pyrophosphate rendering it insoluble and thereby inactive.

Attempts to incorporate other oral care agents such as fluoride compounds in animal chews were unsuccessful as these compounds were also incompatible and unstable with ingredients from which the pet food product was fabricated.

A further disadvantage of the prior art pet oral care products is that they are baked products which are hard and brittle and, although abrasive and initially effective to remove plaque from teeth, quickly lose their effectiveness when chewed because rapid fracture of the product leads to loss of contact of the product with the teeth.

There is therefore a need in the pet food field for a product which is edible and consumable without gastrointestinal complications and effective to remove plaque and to inhibit the formation of tartar in pet animals such as dogs and cats.

SUMMARY OF THE INVENTION

This invention is directed to an edible animal chew product having a flexible cellular matrix in which is incorporated a cellulosic fibrous material having a mechanical cleansing function which, when chewed by the animal, reduces tartar, stain and plaque on the animal's teeth through a physical cleansing action without causing gastrointestinal distress. An oral care agent may be incorporated in the matrix to inhibit dental health problems. When chewed, the flexible, cellular product does not easily fracture and the drag created as the product is chewed by the animal increases the time that the product is retained in the animal's mouth cavity and in contact with its teeth. The product is extruded from ingredients which are inert to oral care additives to assure maximum bioavailability of the additives. The extruded product preferably contains starch, cellulosic fibers, humectant, proteineous binder and one or more oral care additives.

DESCRIPTION OF THE PREFERRED EMBODIMENTS

In general, the edible chew product of the present invention is made by admixing a starch containing ingredient, a cellulosic fibrous material, humectant, and proteineous binder and oral care additives such as tartar control and anticaries additives and then subjecting the moistened admixture to mechanical working in an extruder at an elevated temperature so as to extrude an expanded product having a flexible, cellular matrix.

In the preparation of the chew product of the present invention, the solid components of the chew product;

namely cellulosic fibrous material, starch, and proteineous binder together with any oral care additive, are first admixed together.

The cellulosic fibrous component which provides mechanical cleansing ability to remove dental plaque, stain, tartar and other materia alba accumulating on the animal's tooth surfaces when the product is chewed by the animal is a cellulosic fibrous material including corn cob fractions, cellulose fiber and other plant fibers or microbial polysaccharides. Corn cob fractions are preferred.

Although the cellulosic fibrous materials are not digested by the pet, the pet's digestive system is capable of handling such fibers by passing them through its system substantially unchanged. In fact, the cellulosic fibrous materials provide increased roughage and bulk so as to assist the pet in the digestion of food.

Generally, cellulosic fibrous materials such as corn cob fractions are included in the chew product at a concentration of about 20 to about 50% by dry weight of the chew product and preferably about 25 to about 35% by weight. Corn cob fractions generally range in particle size from about 5 to about 1000 microns and preferably about 20 to about 250 microns.

Corn cob residues from both the woody and shaft portions of the cob are compatible with oral care additives such as tartar control additives including inorganic alkali pyrophosphate salts which are incorporated in the chew product. Corn cob fractions serve the additional function of being moisture absorbent contributing resiliency and flexibility to the chew product. Further, the corn cob fractions also provide a greater range of earth tones and contribute a positive aroma to the chew product.

The term "starch" as used herein includes within its meaning amylaceous hydroxylares containing mono-, di-, tri- and polysaccharides and mixtures thereof such as those derived from wheat, corn or like cereals or tubers. Starch forms a matrix superstructure into which the oral care additives including cellulosic fibrous particles and oral care additives are suspended.

During the fabrication of the chew product by mechanical working in an extruder, starch materials function as an expansion medium. The gelatinization of the mechanically worked product mass due to the heat and moisture introduced during the extrusion process swells the starch granules releasing amylose and amylopectins to thicken and form a gelatinized matrix. The proteineous binder undergoes a similar gelatinization reaction whereby the starch and binder join to form the cellular matrix structure.

Suitable starch materials useful in the preparation of the chew product of the present invention include wheat starch, corn starch, oat starch, rice starch and other complex carbohydrates. The starch is included in the chew product at a concentration of about 30 to about 60% by dry weight and preferably about 40 to about 55% by dry weight of the product.

The proteineous binder incorporated in the chew product has an adhesive effect and binds together the solid particles to form a cohesive, integral mass when the ingredients are heated and extruded to form the expanded cellular product.

Proteineous binder materials suitable for use in the preparation of the chew products of the present invention include collagen and gelatin. Collagen derived from the digestion of beef bones is preferred in the practice of the invention. Gelatin derived from both pork skin and animal bones is also a preferred binder material. The binder material is used in the preparation of the chew product of the present invention at a concentration of about 5 to about 20% by weight of the chew product and preferably about 8 to about 10% by weight. Collagen and gelatin materials also contribute to the flexible texture of the extruded cellular matrix chew product.

Oral care additives that may be incorporated in the chew products of the present invention include tartar control additives such as inorganic pyrophosphate salts including dialkali or tetra-alkali metal pyrophosphate salts such as $Na_4P_2O_7$, $K_4P_2O_7$ $Na_2K_2P_2O_7$, $Na_2H_2P_2O_7$, and $K_2H_2P_2O_7$ and combinations thereof. The tartar control additives are incorporated in the chew products of the present invention at a concentration effective to inhibit tartar formation on the animal's teeth. Suitable concentrations of the pyrophosphate salts range from about 0.5 to about 15% by dry weight and preferably 1.0 to about 10% by dry weight of the chew product.

It is further preferred that a combination of alkali metal pyrophosphate salts be used and particularly a combination of potassium and sodium pyrophosphates at a weight ratio of about 5:1 to 1:1. A weight ratio of about 3:1 is especially preferred.

In addition to pyrophosphate tartar control additives, fluoride containing salts may also be incorporated in the chew product to inhibit phosphate enzymes that hydrolyze and degrade the pyrophosphate salts whereby the tartar control efficacy of these salts is otherwise reduced.

The fluoride-providing salts used in the practice of the present invention are characterized by their ability to release fluoride ions in water and by substantial freedom from reaction with the other ingredients of the chew product. Among these materials are inorganic salts, for example, sodium fluoride, potassium fluoride, a tin fluoride such as stannous fluoride or stannous chlorofluoride, and sodium monofluorophosphate. Alkali metal and tin fluorides, such as sodium fluoride, stannous fluoride, sodium monofluorophosphate and mixtures thereof, are preferred.

When included in the chew product, any suitable minimum amount of the fluoride salt may be used, but it is preferable to employ sufficient salt to release from about 0.05% to 1%, and preferably about 0.1% of fluoride ion. Typically, in the cases of alkali metal fluorides and stannous fluoride, the salt is present in an amount up to 2% by weight, based on the weight of the product, and preferably in the range of from 0.05% to 0.5% by weight.

Other agents suitable for incorporation in the chew product of the present invention include synthetic anionic linear polymeric polycarboxylates which are employed in the form of their partially or preferably fully neutralized water soluble alkali metal (e.g. potassium and preferably sodium) or ammonium salts. The polycarboxylates, like the fluoride salts, inhibit salivary enzymes which hydrolyze pyrophosphates to an inactive form. Preferred are 1:4 to 4:1 copolymers of maleic anhydride or acid and a polymerizable ethylenically unsaturated monomer, preferably a lower alkyl vinyl ether such as methoxyethylene, having a molecular weight of about 30,000 to about 1,000,000. These copolymers are available commercially from GAF Corporation under the trademark Gantrez, e.g. Gantrez S-97 Pharmaceutical Grade (molecular weight 70,0000). The polycarboxylates are incorporated in the chew product of the present invention at a concentration of about 0.25 to about 4% by weight and preferably about 1.0 to about 3.0% by weight.

To impart flexibility to the chew product, it is advantageous to adjust the moisture content of the chew product so that the final product contains water at a concentration equal to or greater than 12% by weight and preferably 16 to 35% by weight.

A humectant is incorporated in the chew product to enhance the flexible chew texture and retain moisture so as to maintain the texture when the chew is stored at ambient temperatures. The preferred humectants are glycerine and sorbitol. Typically, the humectant is incorporated in the chew product at a concentration of about 1 to 15% by weight and preferably about 4 to about 10% by weight of the product.

Suitable flavoring materials may be employed to enhance the palatability of the chew product of the present invention. Examples of suitable flavoring constituents include garlic, wood smoke, meat, and fish extracts and fermentation residues. suitably, the flavoring agent comprises from about 0.01 to 5 percent by weight or more of the chew product of the present invention and preferably, about 0.8 to about 1.5 percent by weight.

The extruded chew product of the present invention is a solid composition having a cellular matrix and a chewy non-brittle texture which is not readily fractured when chewed by the animal and hence offers the animal the intended teeth cleansing benefits stemming from the mechanical cleansing and other contacts with the cellulosic fibrous particles and contained in the chew product. In addition, as the product does not fracture as the animal gnaws on the product, the product remains in contact with the teeth prolonging the bioavailability of the oral care additives contained therein.

As all the ingredients of the chew product are substantially inert and non-reactive with the oral care additives, they are compatible with the oral care additives so that these additives are stable and retain their efficacy during storage before use.

Due to the presence of relatively high moisture levels in the chew product, preservatives such as sodium benzoate, potassium sorbate, sodium propinate, sorbic acid, or paraaminobenzoic acid esters (parabens) alone and in combination may be incorporated into the product to inhibit mold bacteria, yeast formation and growth. The preservative may be incorporated in the chew product at a concentration in the range of about 0.05 to about 4.0% by dry weight and preferably in the range of about 0.1 to about 0.6% by dry weight.

To prepare the chew product, the starch, humectant, proteineous binder, cellulosic fibrous material and oral care additives are transferred to a steam pre-conditioner and subjected to steam and moisture in order to adjust the moisture content to between about 20 and 50% by weight. The conditioned mixture is then extruded under conditions of elevated temperature and pressure to form a continuous ribbon of expanded cellular product that is segmented into discrete particles or pieces by a rotating knife or other cutting means upon exit of the ribbon from the extruder. The chew particles are then allowed to cool and dry at a controlled temperature, e.g. 65–75° F., to adjust the moisture level to about 10 to about 30% by weight.

BRIEF DESCRIPTION OF THE DRAWINGS

In the figure, there is shown one embodiment of an extrusion apparatus 10 which can be used to manufacture the cellular chew product. The extrusion apparatus 10 includes an extruder 12 having a barrel 14 with an inlet 16 located below the outlet of a preconditioner 18; the extruder 12 also having an outlet 20 with a die 22. Hopper 11 is provided to pre-mix the ingredients prior to preconditioning. The barrel 14 as depicted comprises nine barrel sections 24, 25, 26, 27, 28, 29, 30, 31, 32, although the number of barrels may vary without departing from the principles of the present invention. The barrel sections are interconnected to present an elongated bore through the barrel 14 of the extruder 12. Two co-rotating, flighted material advancing screws (not shown) are received in the bore of the barrel and are intermeshed along the majority of the length of the extruder barrel 14 and terminate in the die section 22. The screws feed material to and through the extruder assembly, including a die, at an appropriate flow rate and under appropriate flow conditions. Extrusion apparatus 10 of the type illustrated in the figure is manufactured by Wenger Manufacturing such as the Wegner TX-52 (research extruder) or Wenger TX 80 twin screw (commercial extruder). The pre-conditioner 18 shown in the figure is also manufactured by Wenger Manufacturing, Inc.

In preparing the extruded cellular product of the present invention, using the Wenger TX-80, the solid ingredients from which the chew product is extruded are first pre-mixed in a mixer such as a ribbon mixer and fed to hopper 11. These pre-mixed ingredients include a cellulosic fibrous material such as corn cob fractions, starch, oral care additive, preservative and binder. The pre-mixed solid ingredient is then fed to the preconditioner 18 and admixed with the humectant and other liquid ingredients which are fed directly into the preconditioner 18. In the preconditioner 18 the mixture of ingredients is fed thereto at a rate between 10 and 20 pounds (lbs.)/minute and is further mixed with water which is introduced into the preconditioner at a rate of 0.5 to 4.0 lbs/minute. The temperature of the mixture is raised from ambient to 150° to 200° F. (170° F. being preferred) by the injection of steam into the preconditioner 18 at the rate of 0.5 to 5.0 lbs/minute. Total residence time in the preconditioner 18 generally ranges from 0.5 to 1.5 minutes.

Figure 1:
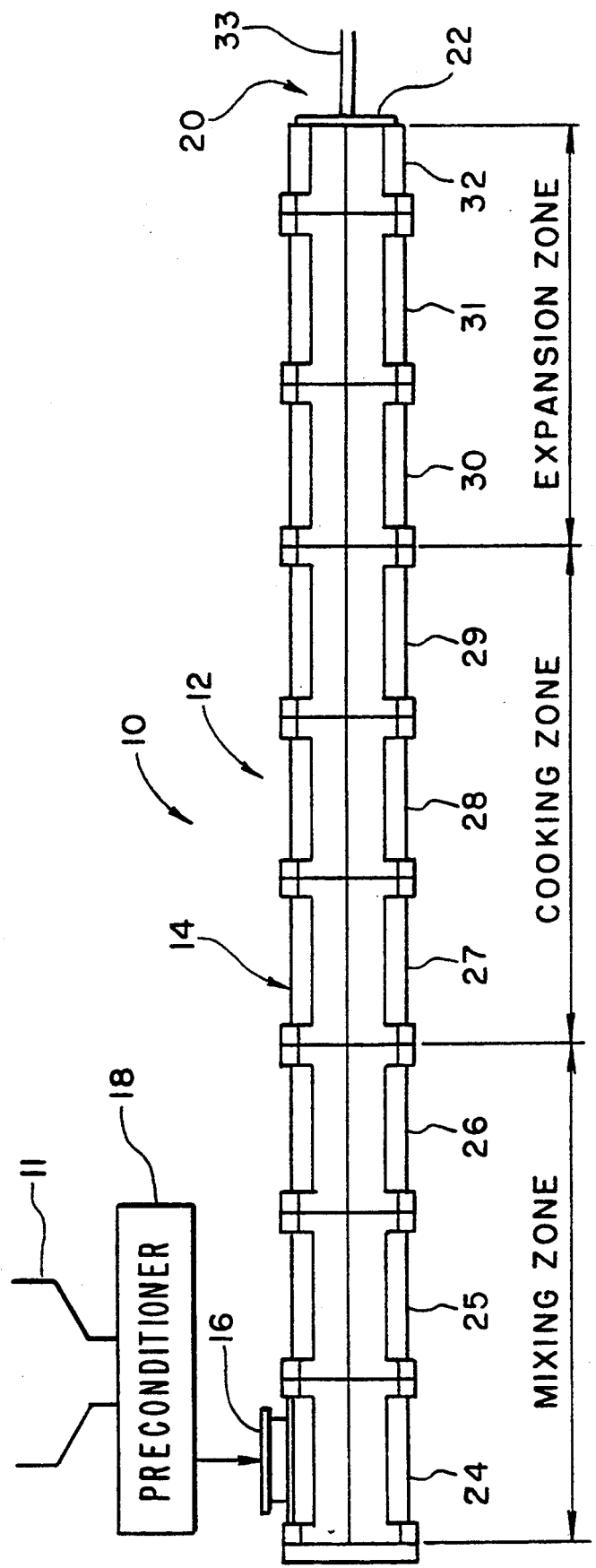

Preconditioning the mixture with steam and water initiates hydration of the binder which is completed by the mechanical working during the extrusion process. The humectant is desirably added after the mixture has been first contacted with the steam/water treatment so as not to compete with the binder for the moisturizing treatment in the preconditioner.

Once the mixture of ingredients and water is introduced into the extruder barrel 14, the mixture is advanced along the length of the barrel 14 by axial rotation of the twin screws. The mixture is sequentially advanced through the extruder and finally through the die 22 at the outlet of the extruder 12, the die 22 having an orifice shaped to yield a ribbon of expanded cellular product. As the mixture passes through the barrel sections 24, 25, 26, 27, 28, 29, 30, 31, and 32, it is mixed, cooked at product temperatures in the range of 200°–280° F. to cause expansion of the extrudate product as it leaves the die 22.

Typically, barrel sections 24, 25 and 26 comprise a Mixing Zone where the moisturized product mixture is introduced and compressed into the extruder barrel 14 at a temperature of 100°–120° F., followed by a Cooking Zone, barrel sections 27, 28 and 29 where the mixture is cooked at a temperature of about 140° to about 200° F. This is followed by an Expansion Zone (barrel sections 30, 31, 32) where the gelatinized mixture undergoes expansion. Thereafter, the product further expands as it is blown out through the orifice of the die 22 as ribbon 33. The blowing out induces the product to further puff or expand to form the desired cellular matrix product.

The pressure within the extruder ranges from about 0 to 100 psi in the Mixing Zone, about 10 to 200 psi in the Cooking Zone and about 100 to 1,000 psi in the Expansion Zone. The residence time in any one zone is about 10 to about 45 seconds and generally about 30 seconds.

The expanded cellular product as it leaves the extruder has a moisture content of about 10 to about 35% water by weight and preferably about 15 to about 25% water by weight.

The thickness of the extruded cellular product is controlled so that it has a thickness of about 0.25 to about 0.75 inches upon leaving the extruder die 22. The ribbon of cellular matrix extrudate 33 is then cut and subdivided into longitudinal 1 to 5 inch sections and allowed to cool and dry to a moisture content of about 12 about 35% by weight water.

The invention is further illustrated by the following specific but non-limiting Example.

EXAMPLE

A mix for the preparation of a dog chew designated "Chew Product I" was prepared which contained the following ingredients:

| Ingredient | Weight % |
|---|---|
| Wheat Starch | 45.42 |
| Corn Cob Fraction* | 32.58 |
| Gelatin (225 Bloom) | 9.87 |
| Glycerin | 4.44 |
| Potassium Sorbate | 0.30 |
| Gantrez S-97 (approx. 13% soln) | 1.92 |
| $K_4P_2O_7$ | 4.00 |
| $Na_4P_2O_7$ | 1.38 |

*60 mesh fraction. Particle size less than 0.15 millimeter, 90% less than 150 microns. Typical sieve analysis as follows:

| mesh | % | mm |
|---|---|---|
| >50 | 0.1 | 0.30 |
| <50 >60 | 2.0 | 0.25 |
| <60 >100 | 55.0 | 0.15 |
| <100 | 45.0 | <0.15 |

The wheat starch, corn cob fraction, pyrophosphate salts, and potassium sorbate were fed to the hopper 11, of a Wenger research twin screw extruder (Model No. TX-52) equipped with a preconditioner 18, and processed to obtain an expanded chew product having a flexible cellular matrix. The TX-52 machine was of the type schematically illustrated in the figure and was provided with two rotatable, flighted material advancing screws and had a total of 9 barrel sections and terminated in a rounded rectangular port with rate controlling throttle valve.

This mixture having a moisture content of 10.82% was fed to the preconditioner at a rate of 150.0 pounds per hour. The mixture was raised in temperature to 170° F. by the injection of steam introduced at a rate of 0.070 pounds per minute into the preconditioner. Water was introduced into the preconditioner at the rate of 0.50 pound per minute. The glycerin and Gantrez ingredients were added to the preconditioner at this point.

Next, the mixture was fed into the inlet 16 of the extruder mixing zone and steam was introduced into the mixture at a rate of 0.080 pounds per minute. The screws of the extruder were rotated at a speed of 380 rpm.

Temperatures of the barrel sections were maintained at 111° F., 111° F., 149° F., 193° F., 182° F., 151° F. and 212° F. for the second, third, fourth, fifth, sixth, seventh, eighth and ninth barrel sections respectively. Product rate through the extruder was about 200 pounds per hour. The product was extruded as continuous flexible ribbon 1.0 inch wide and 0.25 inch thick having a cellular matrix with a water content of 28.01% by weight. The extrudate ribbon was cut into 1.5 foot sections at the extruder head with a rotating knife. The extrudate sections were allowed to dry at ambient temperature in air for one hour. The air dried extrudate sections were determined to have a moisture content of 20% by weight. The dried extrudate sections were further subdivided into 2.75 inch pieces to prepare the final chew product. The final chew product had a spongy, flexible cellular matrix, light tan in color.

A group of 10 pure-bred beagle dogs (ages 1 to 6 years) were individually fed 4 pieces of the chew product daily together with a diet of a commercial canned dog food sold under the name "Hills Canned Canine Maintenance" by Hills Pet Products, Topeka, Kansas, adequate to maintain the weight of each dog for a one week test period. The dogs were fed the canned dog food at about 8 a.m. and two (2) chews at about 10 a.m. and again at about 3 p.m. The individual piece of chew product each weighed about 5 grams.

In observing the eating style of the dogs, it was noted that although the canned dog food ration tended to be gulped by the dogs, the spongy cellular chew product was chewed repeatedly before being swallowed. This chewing action increased the residence time that the chew product was in the dog's mouth thereby increasing the contact time with the teeth of the corn cob particles and pyrophosphate salts contained in the product.

Prior to the feeding test, each dog had been given a thorough dental prophylaxis to remove existing soft and hard deposits on the buccal surfaces of the maxilla and mandible (a total of 22 teeth per dog).

The teeth of each dog in the group was examined for plaque, stain and tartar upon the completion of the test period.

In this examination, each tooth was divided horizontally into a gingival half (next to the gumline) and an occlusal half (away from the gumline). Plaque was scored visually on the corresponding tooth surfaces after staining with 3% erythrosin solution using the following criteria: 1, plaque coverage of up to 25% of the buccal tooth surface; 2, plaque covering between 25 and 50% of the buccal tooth surface; 3, plaque covering between 50 and 75% of the buccal tooth surface and 4, plaque covering between 75 and 100% of the buccal tooth surface.

The thickness of the plaque was scored as follows: Light=1, Medium=2 and Heavy=3. Coverage and thickness scores for each individual tooth surface were then multiplied, to give a total score for that tooth surface. Gingival and occlusal scores were added for each tooth. All tooth scores were added for each animal, then divided by the number of teeth scored to give a mean plaque score for the animal. A mean group plaque score was obtained by averaging individual scores of all animals in the group.

Stain was scored visually on the corresponding tooth surfaces after drying the tooth surface with a gentle jet of air using the following criteria; each tooth was divided vertically into 3 segments, mesial, buccal and distal; the coverage and color of the stain in each segment was then graded independently; 1, stain coverage of up to 25% of the (mesial, buccal or distal) surface, 2, up to 50%; 3, up to 75% and 4, up to 100%. The stain color was scored 1,L (light), 2,M (medium) and 3,D (dark). Coverage and thickness scores for each individual tooth surface were then multiplied, to give a total score for that tooth surface. Mesial, buccal and distal segment scores were added for each tooth. All tooth scores were added for each animal, then divided by the number of teeth scored to give a mean stain score for the animal. A mean group stain score was obtained by averaging individual scores of all animals in the group.

Tartar was scored visually for area coverage on the corresponding tooth surfaces in the same manner as stain.

The plaque, stain and tartar scores for this group of dogs which were fed Chew Product I are recorded in Table I below. For purposes of comparison, the procedure of the Example was repeated with the exception that the dogs were not fed the chew product. The results of this test are also recorded in Table I below with the designation "Control".

The procedure of the Example was repeated with the exception that the chew product fed to the dogs was derived from an extrudate which did not contain any pyrophosphate salts. This chew product was designated "Chew Product II". The plaque, stain and tartar scores for the group of dogs fed Chew Product II are also recorded in Table I.

For purposes of further comparison, the procedure of the Example was repeated with the exception that, instead of the chew product of the present invention, the dogs were fed four biscuits of a commercially available baked biscuit product containing a pyrophosphate salt oral care additive. The results of this test are also recorded in Table I below with the designation "Comparison I".

TABLE I

| Chew Product | Mean Group Plaque Score | Mean Group Stain Score | Mean Group Tartar Score |
|---|---|---|---|
| CHEW PRODUCT I | 5.59 | 1.26 | 2.43 |
| CHEW PRODUCT II | 6.77 | 2.35 | 3.49 |
| COMPARISON I | 8.34 | 3.24 | 4.54 |
| CONTROL | 8.87 | 3.60 | 5.10 |

The above results show that the chew product of the present invention, namely Chew Products I and II, is significantly effective in reducing plaque, stain and tartar in dogs, especially when compared to the control as well as the comparative chew product.

Based on the mean group scores of Table I, the percent reduction obtained in plaque, stain and tartar as obtained with the chew products of the present invention (Chew Products I and II) or the commercial baked product compared to not feeding the dogs a chew product, is summarized in Table II below.

TABLE II

| | % REDUCTION | | |
|---|---|---|---|
| | PLAQUE | STAIN | TARTAR |
| CHEW PRODUCT I | 37.0 | 65.0 | 52.4 |
| CHEW PRODUCT II | 23.7 | 34.7 | 31.6 |
| COMPARISON I | 6.0 | 10.0 | 11.0 |

The data recorded in Table II demonstrate the significantly greater reduction in plaque, stain and tartar obtained with the chew product of the present invention when compared to a commercial baked product containing a pyrophosphate salt oral care additive.

What is claimed is:

1. A composition to be chewed by an animal for removing plaque, tartar and stain from the teeth of the animal, which composition comprises an edible, solid unbaked extrudate product having a chewable, flexible cellular matrix in which is incorporated an effective mechanical cleansing amount of a cellulosic fibrous material, water to adjust the moisture concentration equal to or greater than 12% by weight and a humectant at a concentration of about 1 to about 15% by weight, said moisture imparting flexibility to the composition and retaining moisture so as to maintain the texture when the composition is stored.

2. The composition of claim 1 in which an effective amount of a pyrophosphate salt tartar control oral care additive is incorporated in the cellular matrix, the cellular matrix being substantially inert to the oral care additive.

3. The composition of claim 1 wherein the cellular matrix is comprised of a starch.

4. The composition of claim 1 wherein the cellular matrix has incorporated therein a proteinaceous binder.

5. The composition of claim 2 wherein the oral care additive is an alkali metal pyrophosphate salt.

6. The composition of claim 5 wherein the alkali metal pyrophosphate salt is a mixture of potassium and sodium pyrophosphates at a weight ratio of about 5:1 to about 3:1.

7. The composition of claim 1 wherein water is contained in the cellular matrix at a concentration of about 10 to about 35% by weight.

8. The composition of claim 3 wherein the starch is incorporated in the cellular matrix at a concentration of about 30 to about 60% by weight.

9. The composition of claim 3 wherein the starch is wheat starch.

10. The composition of claim 4 wherein the proteinaceous binder is incorporated in the product at a concentration of about 5 to about 20% by weight.

11. The composition of claim 5 wherein the pyrophosphate salt is incorporated in the product at a concentration of about 0.5 to about 15% by weight.

12. The composition of claim 1 wherein a humectant is incorporated in the product at a concentration of about 1 to about 15% by weight.

13. The composition of claim 12 wherein the humectant is glycerin.

14. The composition of claim 2 wherein a synthetic anionic linear polymeric polycarboxylate is incorporated therein.

15. The composition of claim 14 wherein the polycarboxylate is a copolymer of maleic anhydride or acid and methoxyethylene.

16. The composition of claim 15 wherein the polycarboxylate is incorporated in the composition at a concentration of about 0.25 to about 4% by weight.

17. A method of removing plaque, tartar and stain from the teeth of an animal which comprises feeding the animal an edible, chewable, flexible unbaked extrudate product having a cellular matrix, the cellular matrix having incorporated therein of an effective mechanical cleansing amount of a cellulosic fibrous material, water to adjust the moisture concentration equal to or greater than 12% by weight and a humectant at a concentration of about 1 to about 15% by weight, said moisture imparting flexibility to the composition and retaining moisture so as to maintain the texture when the composition is stored and the animal chewing product.

18. The method of claim 17 wherein there is incorporated in the cellular matrix a pyrophosphate salt tartar control oral care additive, the ingredients forming the cellular matrix being substantially inert to the oral care agent.

19. The method of claim 17 wherein the cellular matrix is comprised of a starch.

20. The method of claim 17 wherein the cellular matrix contains a proteinaceous binder.

21. The method of claim 18 wherein the oral care additive is an alkali metal pyrophosphate salt.

22. The method of claim 21 wherein the alkali metal pyrophosphate salt is a mixture of potassium and sodium pyrophosphates at a weight ratio of about 5:1 to about 3:1.

23. The method of claim 17 wherein water is contained in the cellular matrix at a concentration of about 10 to about 35% by weight.

24. The method of claim 19 wherein the starch is incorporated in the cellular matrix at a concentration of about 30 to about 60% by weight.

25. The method of claim 19 wherein the starch is wheat starch.

26. The method of claim 20 wherein the proteinaceous binder is incorporated in the product at a concentration of about 5 to about 20% by weight.

27. The method of claim 21 wherein the pyrophosphate salt is incorporated in the product at a concentration of about 0.5 to about 15% by weight.

28. The method of claim 17 wherein a humectant is incorporated in the product at a concentration of about 1 to about 15% by weight.

29. The method of claim 28 wherein the humectant is glycerin.

30. The method of claim 17 wherein a synthetic anionic linear polymeric polycarboxylate is incorporated therein.

31. The method of claim 30 wherein the polycarboxylate is a copolymer of maleic anhydride or acid and methoxyethylene.

32. The method of claim 30 wherein the polycarboxylate is incorporated in the product at a concentration of about 0.25 to about 4% by weight.

* * * * *